US012590800B2

(12) United States Patent
Sanders et al.

(10) Patent No.: US 12,590,800 B2
(45) Date of Patent: Mar. 31, 2026

(54) STABILITY ENHANCED RESONATOR FIBER OPTIC GYRO (RFOG)

(71) Applicant: Honeywell International Inc., Charlotte, NC (US)

(72) Inventors: Glen A. Sanders, Scottsdale, AZ (US); Marc Smiciklas, Phoenix, AZ (US); Matthew Wade Puckett, Phoenix, AZ (US); Tiequn Qiu, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 383 days.

(21) Appl. No.: 18/349,715

(22) Filed: Jul. 10, 2023

(65) Prior Publication Data

US 2025/0020466 A1 Jan. 16, 2025

(51) Int. Cl.
*G01C 19/72* (2006.01)

(52) U.S. Cl.
CPC ................................... *G01C 19/727* (2013.01)

(58) Field of Classification Search
CPC ..... G01C 19/727; G01C 19/721; G01C 19/72
See application file for complete search history.

(56) References Cited

U.S. PATENT DOCUMENTS 11,204,246 B1 12/2021 Strandjord et al.
11,624,614 B1 4/2023 Strandjord et al.

2004/0036885 A1 2/2004 Olson et al.
2011/0181886 A1 7/2011 Strandjord et al.
2014/0369699 A1* 12/2014 Strandjord ........... G01C 19/723
398/187
2018/0328732 A1 11/2018 Sanders et al.
2021/0389128 A1 12/2021 Strandjord et al.

OTHER PUBLICATIONS

European Patent Office, "Extended European Search Report", dated Apr. 25, 2025, from EP Application No. 24174915.9, from Foreign Counterpart to U.S. Appl. No. 18/349,715, pp. 1 through 9, Published: EP.
Sanders et al., "Improvements to Signal Processing and Component Minaturization of Compact Resonator Fiber Optic Gyroscopes", 2018 DGON Inertial Sensors and Systems (ISS), IEEE, Sep. 11, 2018, pp. 1-22.

* cited by examiner

*Primary Examiner* — Hwa Andrew Lee
(74) *Attorney, Agent, or Firm* — Fogg & Powers LLC

(57) ABSTRACT

A method is provided that includes combining a light wave from a master laser with a light wave from a first slave laser to produce a first signal including a first beat note signal, detecting the first signal, providing the first signal to a first mixer in a feedback path of a first optical phase lock loop, receiving a signal from a first offset frequency source at the first mixer, applying a first notch filter in the feedback path of the first optical phase lock loop after the first mixer to remove mixer products from an output of the first mixer, locking a frequency of the light wave from the master laser to a resonant frequency of a fiber optic resonator, and phase locking the first slave laser to the frequency of the master laser in the first optical phase lock loop at a first offset frequency.

2 Claims, 7 Drawing Sheets

STABILITY ENHANCED RESONATOR FIBER OPTIC GYRO (RFOG)

STATEMENT REGARDING FEDERALLY SPONSORED RESEARCH AND DEVELOPMENT

This invention was made with Government support under Contract No. DOTC-19-01-INT1133 awarded by US Army. The Government has certain rights in the invention.

BACKGROUND

Resonator Fiber Optic Gyroscopes (RFOGs) are a type of sensor that measures rotation rate of an object. In one use, RFOGs, along with accelerometers and other sensors, provide data necessary for the proper operation of navigation systems in vehicles such as aircraft, land-based vehicles, and watercraft.

In general, an RFOG uses counterpropagating laser light waves in an optical resonator to determine rotation rate. For example, laser light waves—one in the clockwise (CW) direction and the other in the counterclockwise (CCW) direction—are frequency-tuned to propagate at resonance within an optical fiber ring resonator. The RFOG measures these resonance frequencies of the resonator. In the presence of rotation rate, $\Omega$, the resonance frequencies will be different in proportion to the rotation rate (due to the Sagnac Effect), and therefore the two laser light waves will be tuned to different frequencies. For example, the light wave from a first laser, propagating in the CW direction, is tuned to a first frequency (designated as $f_0$). The light wave from a second laser, propagating in the CCW direction, is tuned to a frequency $f_0$ plus a differential component designated as $\Delta f_\Omega$. This differential component, $\Delta f_\Omega$, is then measured to determine the rotation rate, $\Omega$; the output of the RFOG.

Over time, the design of RFOGs has evolved to provide more accurate rotation rate data by addressing various sources of errors and shortcomings in prior designs. These improvements have dealt with issues such as intensity error, interference error, phase noise, relative frequency jitter, backscatter and laser instability to name a few.

Despite the many advances in RFOG design, developers continue to improve the RFOG design with the goal to produce rugged, low-cost navigation-grade RFOGs that are compatible with commercial and military aircraft navigation performance. During recent testing of a current RFOG design, we discovered a new source of error in the operation of RFOGs using a multi-frequency laser source (MFLS) having a master laser and two slave lasers. As the RFOG was operated over a temperature range, it was determined that the new error source, if uncorrected, would lead to bias instability, and thus unacceptable RFOG performance.

Thus, there is a need in the art for an RFOG that addresses this new source of error in an RFOG using an MFLS to produce an output with low bias instability over temperature.

SUMMARY

In some aspects, the techniques described herein relate to a resonator fiber optic gyroscope (RFOG), including: a fiber optic resonator; a master laser that is configured to transmit a light wave with a frequency that is locked to a resonant frequency of the fiber optic resonator; a first slave laser that is configured to transmit a light wave at a frequency that is phase locked to the frequency of the master laser in a first optical phase lock loop at a first offset frequency to provide a clockwise signal (CW) to the fiber optic resonator; and a second slave laser that is configured to transmit a light wave at a frequency that is phase locked to the frequency of the master laser in a second optical phase lock loop at a second offset frequency to provide a counterclockwise signal (CCW) to the fiber optic resonator; wherein the first optical phase lock loop includes a first mixer in a first feedback path for the first slave laser, the first feedback path also including a first notch filter and a first laser driver, the first notch filter coupled between the first mixer and the first laser driver and configured to receive an output of the first mixer and configured to remove mixer products from the output of the first mixer.

In some aspects, the techniques described herein relate to a resonator fiber optic gyroscope (RFOG), including: a fiber optic resonator; a master laser that is configured to transmit a light wave with a frequency that is locked to a resonant frequency of the fiber optic resonator; a first slave laser that is configured to transmit a light wave at a frequency that is phase locked to the frequency of the master laser in a first optical phase lock loop at a first offset frequency to provide a clockwise signal (CW) to the fiber optic resonator; a second slave laser that is configured to transmit a light wave at a frequency that is phase locked to the frequency of the master laser in a second optical phase lock loop at a second offset frequency to provide a counterclockwise signal (CCW) to the fiber optic resonator; and a Pound-Drever-Hall (PDH) stabilization loop that is configured to lock the master laser to the resonant frequency, and a summing junction coupled in the PDH stabilization loop that is configured to receive a common modulation signal that has a frequency that is low relative to a linewidth of the fiber optic resonator, and causes the first slave laser and the second slave laser to have an optical frequency modulation component at the frequency of the common modulation signal.

In some aspects, the techniques described herein relate to a method, including: combining a light wave from a master laser with a light wave from a first slave laser to produce a first combined signal including a first beat note signal; detecting the first combined signal including the first beat note signal; providing the first combined signal including the first beat note signal to a first port of a first mixer in a feedback path of a first optical phase lock loop; receiving a signal from a first offset frequency source at a second port of the first mixer; applying a first notch filter in the feedback path of the first optical phase lock loop after the first mixer to remove mixer products from an output of the first mixer; locking a frequency of the light wave from the master laser to a resonant frequency of a fiber optic resonator; and phase locking the first slave laser to the frequency of the master laser in the first optical phase lock loop at a first offset frequency.

In some aspects, the techniques described herein relate to a method, including: locking a frequency of a light wave from a master laser to a resonant frequency of a fiber optic resonator using a Pound-Drever-Hall (PDH) stabilization loop; phase locking a first slave laser to the frequency of the master laser in a first optical phase lock loop at a first offset frequency; combining the light wave from the master laser with a light wave from the first slave laser to produce a first combined signal including a first beat note signal; detecting the first combined signal including the first beat note signal; providing the first combined signal including the first beat note signal to a first port of a first mixer in a feedback path of the first optical phase lock loop; receiving a signal from a first offset frequency source at a second port of the first mixer; and injecting a common modulation signal that has a frequency that is low relative to a linewidth of the fiber optic resonator into the PDH stabilization loop to modulate the first slave laser and a second slave laser at the frequency of the common modulation signal.

In some aspects, the techniques described herein relate to a resonator fiber optic gyroscope (RFOG), including: a fiber optic resonator; a master laser that is configured to transmit a light wave with a frequency that is locked to a resonant frequency of the fiber optic resonator; a first offset frequency source that is coupled to receive a detected and demodulated light signal from the fiber optic resonator; a first slave laser that is configured to transmit a light wave at a frequency that is phase locked to the frequency of the master laser in a first optical phase lock loop at a first offset frequency from the first offset frequency source to provide a clockwise signal (CW) to the fiber optic resonator; a second offset frequency source that is coupled to receive a detected and demodulated light signal from the fiber optic resonator; a second slave laser that is configured to transmit a light wave at a frequency that is phase locked to the frequency of the master laser in a second optical phase lock loop at a second offset frequency from the second offset frequency source to provide a counterclockwise signal (CCW) to the fiber optic resonator; and wherein the first optical phase lock loop includes a first mixer in a first feedback path for the first slave laser, the first feedback path also including a first notch filter and a first laser driver, the first notch filter configured to receive an output of the first mixer and configured to remove mixer products from the output of the first mixer; wherein the second optical phase lock loop includes a second mixer in a second feedback path for the second slave laser, the second feedback path also including a second notch filter and a second laser driver, the second notch filter configured to receive an output of the second mixer and configured to remove mixer products from the output of the second mixer.

BRIEF DESCRIPTION OF THE DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

In recent experiments with a resonator fiber optic gyroscope (RFOG) using a multi-frequency laser source (MFLS), we determined that an undesired error current being picked up by a slave laser in the optical phase lock loop of the MFLS produces bias instability over temperature. Additionally, we discovered that the error current picked up in the optical phase lock loop also introduced an undesired frequency modulation (different from the intended time-varying frequency shift) which modulates the frequency of the slave laser and puts sidebands on the slave laser frequency that are integer multiples of an offset frequency (referred to as $\Delta F_1$ below). This "pick-up" could be electrostatic pick-up, or via ground loops on electronics cards or in electronics components. The unintended laser sidebands generated by this pickup can then fall on resonator resonances that are many free spectral ranges away from the resonances that are used for rotation measurement. This causes errors every time the laser frequencies are tuned over a certain frequency range, which is necessary to track the resonator over temperature. Additionally, mixers, used in the phase lock loops for the slave lasers of the MFLS, may also produce unintended laser sidebands at integer multiples of the offset frequency due to leakage from the mixer or undesired mixer products, as explained in more detail below. Errors from both the error current pick-up and from leakage and mixer products lead to bias instability over temperature in the operation of the RFOG.

Figure 1:
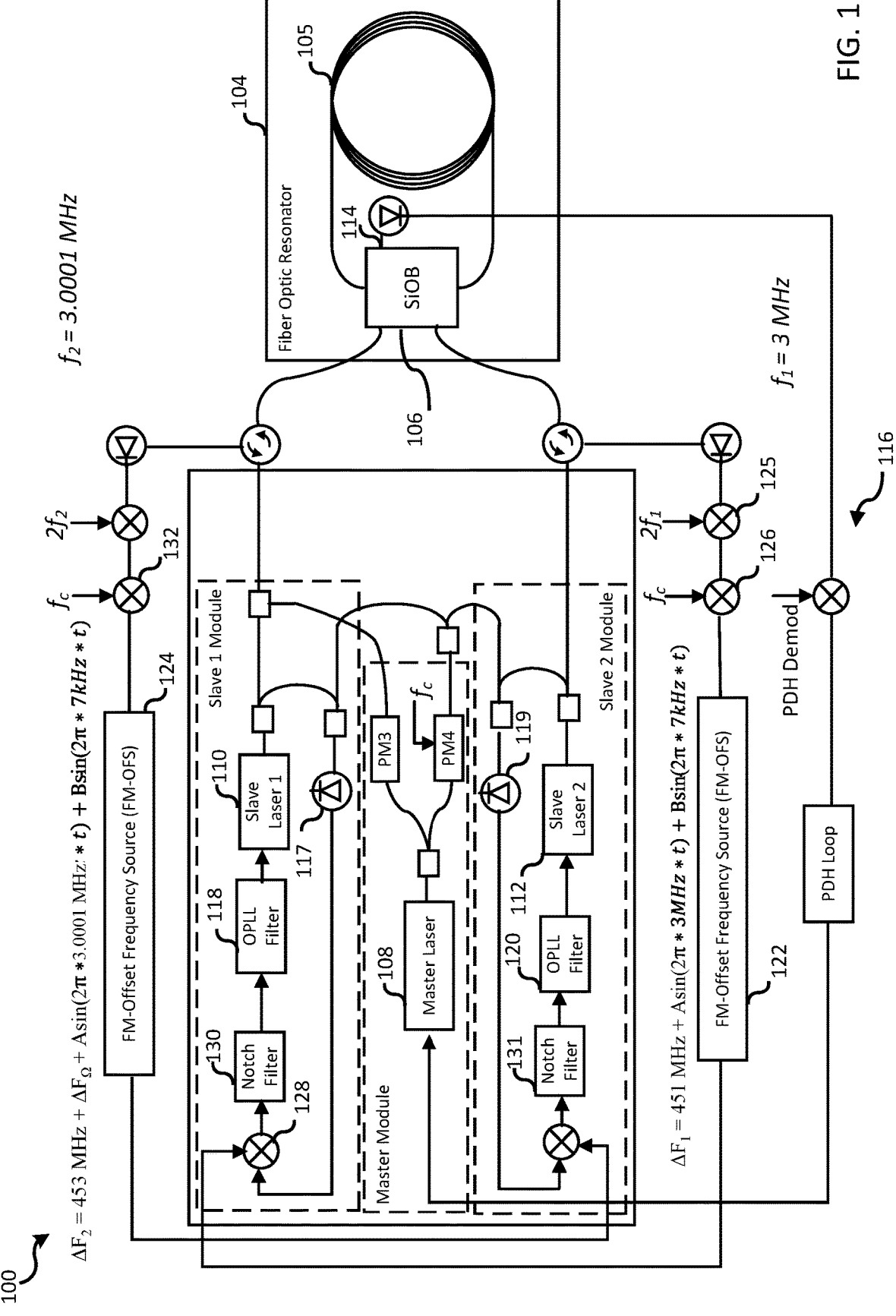
FIG. 1 is block diagram of one embodiment of a resonator fiber optic gyroscope (RFOG) with filtering and shielding in the optical phase lock loop to reduce bias errors over temperature according to the teachings of the present invention.

FIG. 1 illustrates one embodiment of a resonator fiber optic gyroscope (RFOG), indicated generally at 100, including a multi-frequency laser source (MFLS) that includes notch filters 130 and 131 in the optical phase lock loop circuitry of slave laser 1 (110) and slave laser 2 (112), respectively, that are intended to reduce the bias instability over temperature caused, at least in part, by signal picked-up in the drivers for slave laser 1 (110) and slave laser 2 (112). The sources of the increased bias instability and the remedial measures used to address this issue are described in more detail below.

RFOG 100 includes a fiber optic resonator 104 with a sensing or resonator coil 105. In one embodiment, fiber optic resonator 104 includes resonator coil 105 formed from, in a non-limiting example, 100 m of polarization maintaining fiber wound on a two-inch diameter mandrel. In other embodiments, fiber optic resonator 104 is formed from other lengths of fiber and sized of mandrel dependent on performance needs of the RFOG. Additionally, RFOG 100 includes a silicon optical bench (SiOB) 106 holding tiny ball lenses, mirrors, and beam-splitters to close the loop of resonator coil 105 as well as to provide light coupling into and out of the resonator coil 105.

RFOG 100 includes an MFLS to provide the light input to fiber optic resonator 104. The MFLS consists of three semiconductor lasers; a master laser 108 and two slave lasers; slave laser 1 (110) and slave laser 2 (112). The master laser 108 transmits a light wave that is locked to the fiber optic resonator 104 using the well-known Pound-Drever-Hall (PDH) stabilization technique. This is accomplished by directing a portion of the light wave from the master laser 108 through a phase modulator (PM3) where it is modulated to provide a PDH signal, at the clockwise (CW) reflection port 114 of the fiber optic resonator 104, which is demodulated by the PDH loop electronics 116. Another portion of the light wave from master laser 108 is directed through a phase modulator (PM4) and then to be optically mixed on photodiodes 117 and 119 with portions of the light waves transmitted from slave laser 1 (110) and slave laser 2 (112), respectively, to generate beat notes. This is used by two sets of optical phase lock loop (OPLL) electronics 118 and 120 to phase lock the frequencies of slave laser 1 (110) and slave laser 2 (112), respectively, to the frequency of master laser 108 plus offset frequencies produced by the FM Offset Frequency Source (FM-OFS) 122 and 124 respectively. The OPLLs transfer the master/resonator relative frequency stability to the slaves. Furthermore, the phase modulation imposed by PM4 is transferred to slave laser 1 (110) and slave laser 2 (112) as a common frequency modulation which is used for precise detection of the center frequencies of the clockwise (CW) and counterclockwise (CCW) resonance transmission peaks. The common modulation is applied at frequency $f_C$, which is relatively low compared to the resonator linewidth.

The CW and CCW slave laser light picks up extra phase modulation at frequencies $f_1$ and $f_2$, which are relatively high compared to the resonator linewidth. The high-frequency (HF) phase modulation along with double demodulation is used to suppress optical backscatter errors. The CW (and CCW) resonance peaks are separated by one free-spectral range (FSR). In this example, $f_1$ is set to equal an integer plus ½ an FSR. Therefore, when the laser carrier is exactly in the middle of two adjacent resonances, the first order upper and lower sidebands produced by the HF modulation will be at the center frequency of the corresponding upper and lower transmission peaks. (The HF modulation generates sidebands at many harmonics but considering only the first order sidebands is sufficient to understand how the technique works). The two sidebands will interfere at the transmission port, thus producing a beat note that is at twice the HF modulation frequency, or at $2f_1$. The method works for any HF modulation frequency that is a multiple plus a half of an FSR, or $f_1=(n+\frac{1}{2})$FSR, where n is an integer.

The common modulation, $f_c$, can be viewed as sweeping the sidebands back and forth over the resonance peaks. When the sidebands are exactly on resonance, the transmitted beat note intensity signal at $2f_1$ is amplitude modulated at twice the common modulation frequency. When the sidebands move slightly away from the center of the resonance peaks, due to the laser carrier frequency changing, the resulting beat note will have some amplitude modulation at $f_c$. Double demodulating the resonator transmission output will produce an error signal that indicates when the sidebands are exactly on resonance. The resonator transmission output is first demodulated by mixer 125 at $2f_1$, then the first demodulator output is demodulated by mixer 126 at $f_c$. As the laser carrier frequency is swept through many FSRs, assuming the PDH loop is not locked, and the first demodulator stage output is low-pass-filtered (to remove signals due to harmonics of $f_1$). In the resulting waveform, positive going peaks correspond to when the modulation induced odd harmonic sidebands pass through resonance, and negative going peaks correspond to when the laser carrier and the even harmonic sidebands pass through resonance. The second demodulator output passes through zero with a steep slope (high sensitivity to laser frequency deviations from resonance) when either the odd sidebands or the laser carrier and even sidebands pass through resonance. The output of the second demodulator is used as a feedback loop error signal to control the laser carrier frequency to follow the resonance frequencies with a fixed offset.

To suppress backscatter errors, the CW and CCW HF modulation frequencies, $f_1$ and $f_2$, are set to slightly different values. In this way, the sideband beat note signal due to backscatter from one direction will be at a different frequency than the beat note from the intended direction, and thus will be rejected by the first stage demodulator. Since $f_1$ and $f_2$ are slightly different, at least one cannot be set exactly to $(n+\frac{1}{2})$FSR. However, HF modulation imperfections, such as $2^{nd}$ harmonic distortion and intensity modulation, can be shown to vanish when the HF modulation frequency is set to exactly $(n+\frac{1}{2})$FSR, which is referred to as the "HF proper frequency".

When the HF modulation frequency is not at a proper frequency, the sidebands will pass through resonance at different carrier frequencies, which introduces errors due to modulation imperfections. In the presence of unwanted intensity modulation (that, at some low level, unavoidably accompanies the desired phase modulation) a distortion in the detected resonance lineshape is produced, which results in a shift in the detected resonance frequency. If the HF modulation frequency is exactly at the proper frequency, the upper and lower sidebands will be on resonance at the same carrier frequency. Therefore, even if there is an imbalance in their optical power due to intensity modulation, the detected lineshapes remain symmetrical. The argument for second harmonic distortion of HF modulation is similar. As long as the HF modulation frequency separation required for suppressing backscatter errors can be small enough to allow operation close to a HF proper frequency, then backscatter errors can be adequately suppressed while having reasonable requirements on HF modulation imperfections. In one embodiment, $f_1$ is 3 MHz, and $f_2$ is 3.0001 MHz.

Figure 2:
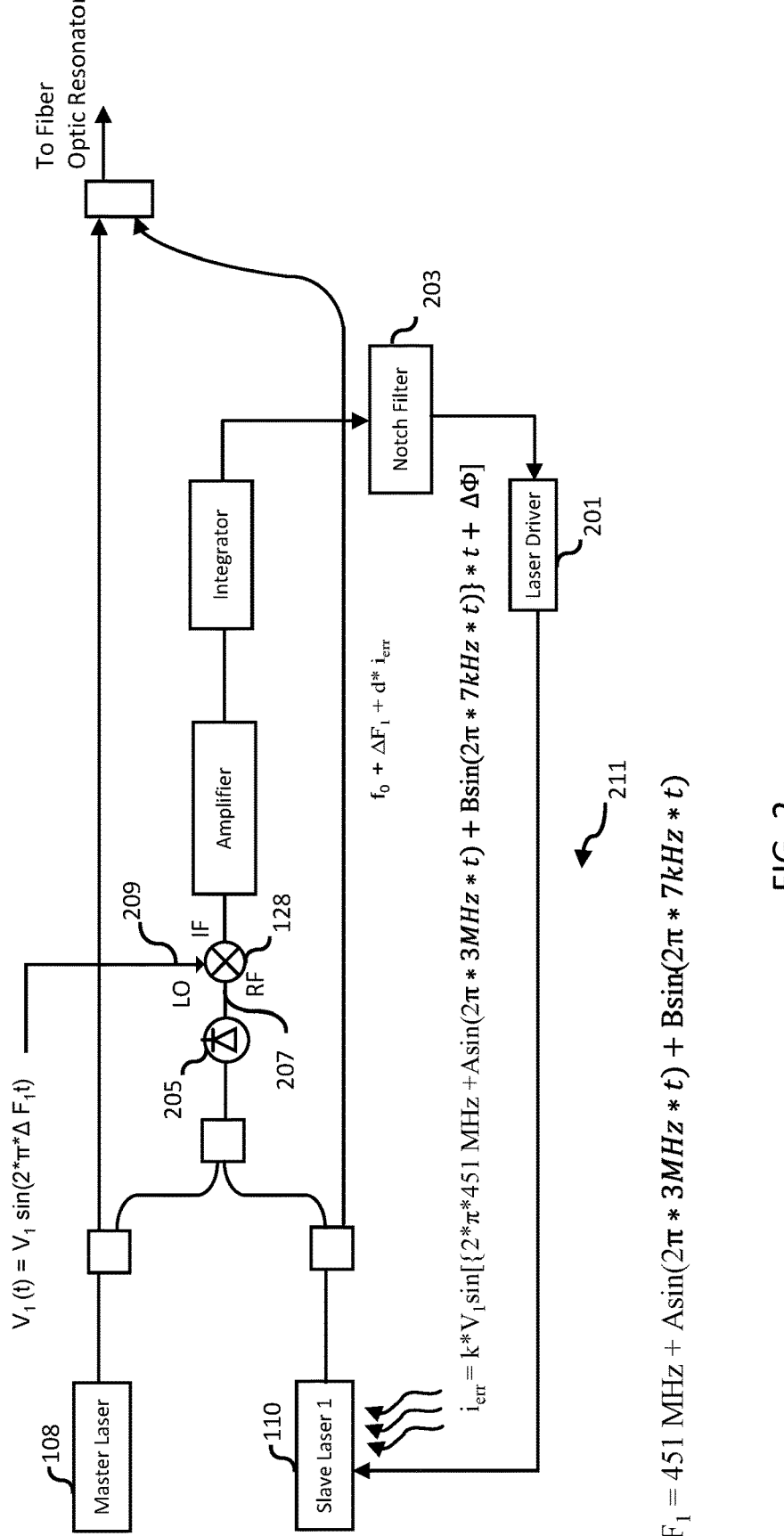
FIG. 2 is a block diagram of one embodiment of a portion of the RFOG of FIG. 1 that illustrates aspects of the optical phase lock loop that improve bias stability over temperature according to one embodiment of the present invention.

Returning to the new source of error discovered with the design of this RFOG. One problem with this RFOG design is best shown in FIG. 2. The output of offset frequency source 122 is labelled $V_1(t)$ in FIG. 2, and the formula for $\Delta F_1$ is list on FIG. 2 as 451 MHz+A sin($2\pi$*3 MHz*t)+B sin($2\pi$*7 kHz*t). $V_1(t)$ is provided to mixer input 209 of local oscillator (mixer) 128. We have discovered that, unfortunately, $V_1(t)$ is picked up by the current from laser driver 201 that provides control current (DC) to slave laser 1 (110). This pickup occurs because the MFLS components are packaged in close proximity, and possibly the fact that the channels of the MFLS have been insufficiently shielded to reduce crosstalk.

With the discovered pickup, slave laser 1 (110) receives an undesired error current labelled $i_{err}$ as seen in FIG. 2 and there is also undesired frequency modulation (different from the intended time varying frequency shift) which modulates the frequency of light output by slave laser 1 (110) and puts sidebands on the frequency of light from slave laser 1 (110) that are +/−integer multiples of $\Delta F1$. This "pickup" could be electrostatic pickup, or via ground loops on electronics cards or in electronics components. The unintended laser sidebands generated by this pickup can then fall on resonator resonances that are many free spectral ranges away from the resonances that are used for rotation measurement. This causes errors every time the laser frequencies are tuned over a certain frequency range, which is necessary to track the resonator over temperature. This can be seen in FIG. 4, where laser frequency of the CW laser signal in fiber optic resonator 104 is changed by 1 free spectral range (FSR) of the resonator as bias errors occur every ½ FSR depicted by the sharp rise, fall and return to near zero in the bias level.

Figure 4:
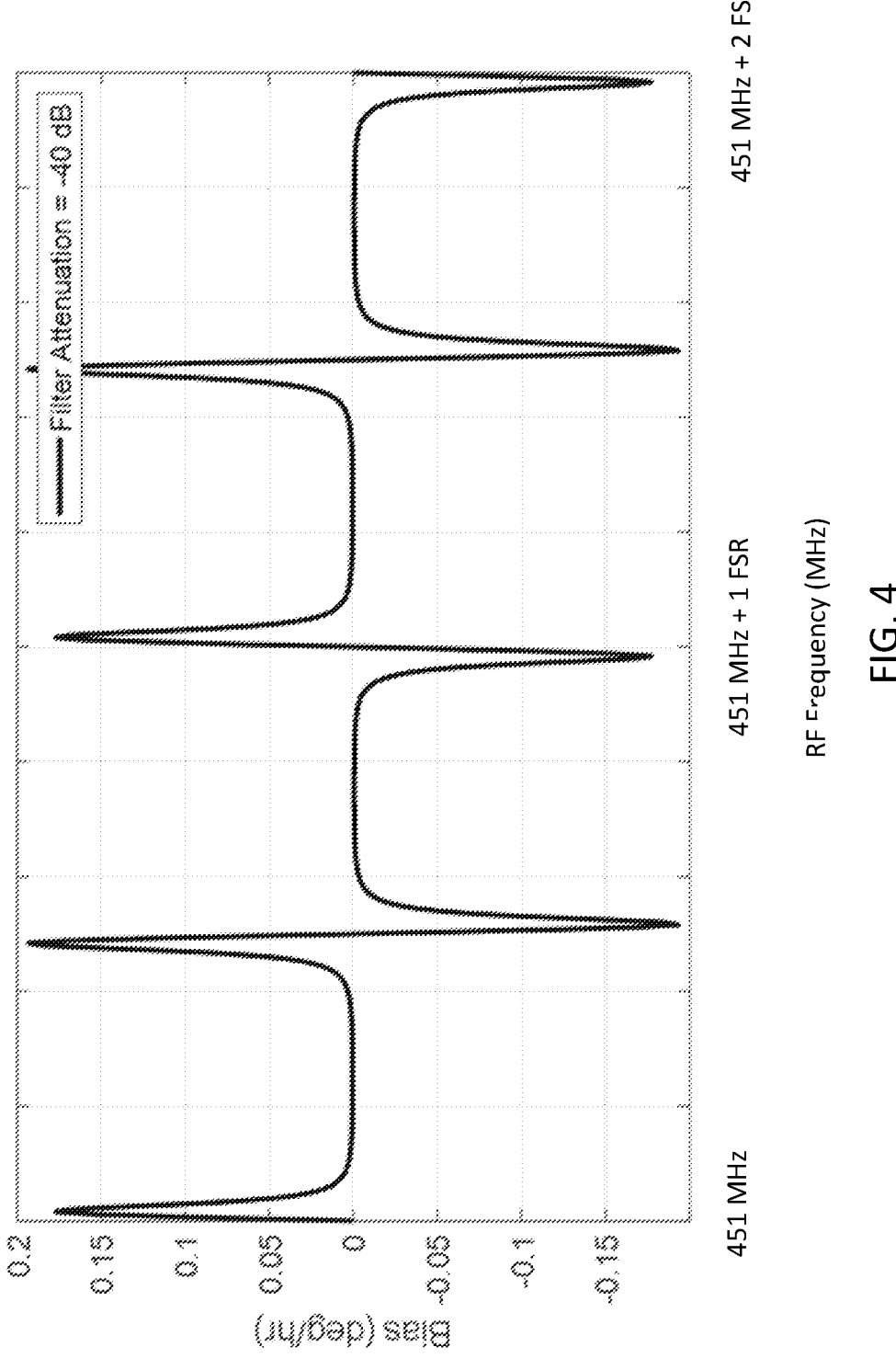

There is another way that the error of FIG. 4 can be incurred. Returning to FIG. 2, mixer 128 includes a second mixer input 207. Second mixer input 207 is coupled to photodetector 205. The photodetector 205 receives an optical signal that is the combination of the output of master laser 108 and slave laser 1 (110). This combination includes the "beat note" signal which represents the instantaneous optical frequency difference between light from master laser 108 and light from slave laser 1 (110). Mixer 128 thus multiplies the reference signal $V_1(t)$) at mixer input 209 by the beat note signal (from photodetector 205) at second mixer input 207. Any DC component on the beat note signal can mix with the offset frequency (e.g., 451 MHz for slave laser 1 and 453 MHz for slave laser 2) to give a signal at the offset frequency coming out of the OPLL mixer, which will also drive the slave current and produce undesirable sidebands at +/– integer multiples of the offset frequency. To that end, typical servos try to eliminate DC inputs to the mixer and filter out any mixer output frequencies around the offset frequencies, in this case 451 MHz and 453 MHz+$\Delta$f$\Omega$. However, if some DC component is in the input from photodetector 205, it can result in the errors that we recently discovered. In some embodiments, AC coupling is used at inputs of mixers in the optical phase lock loops of RFOG 100 to reduce the impact of any DC components in the respective input signals.

Figure 3:
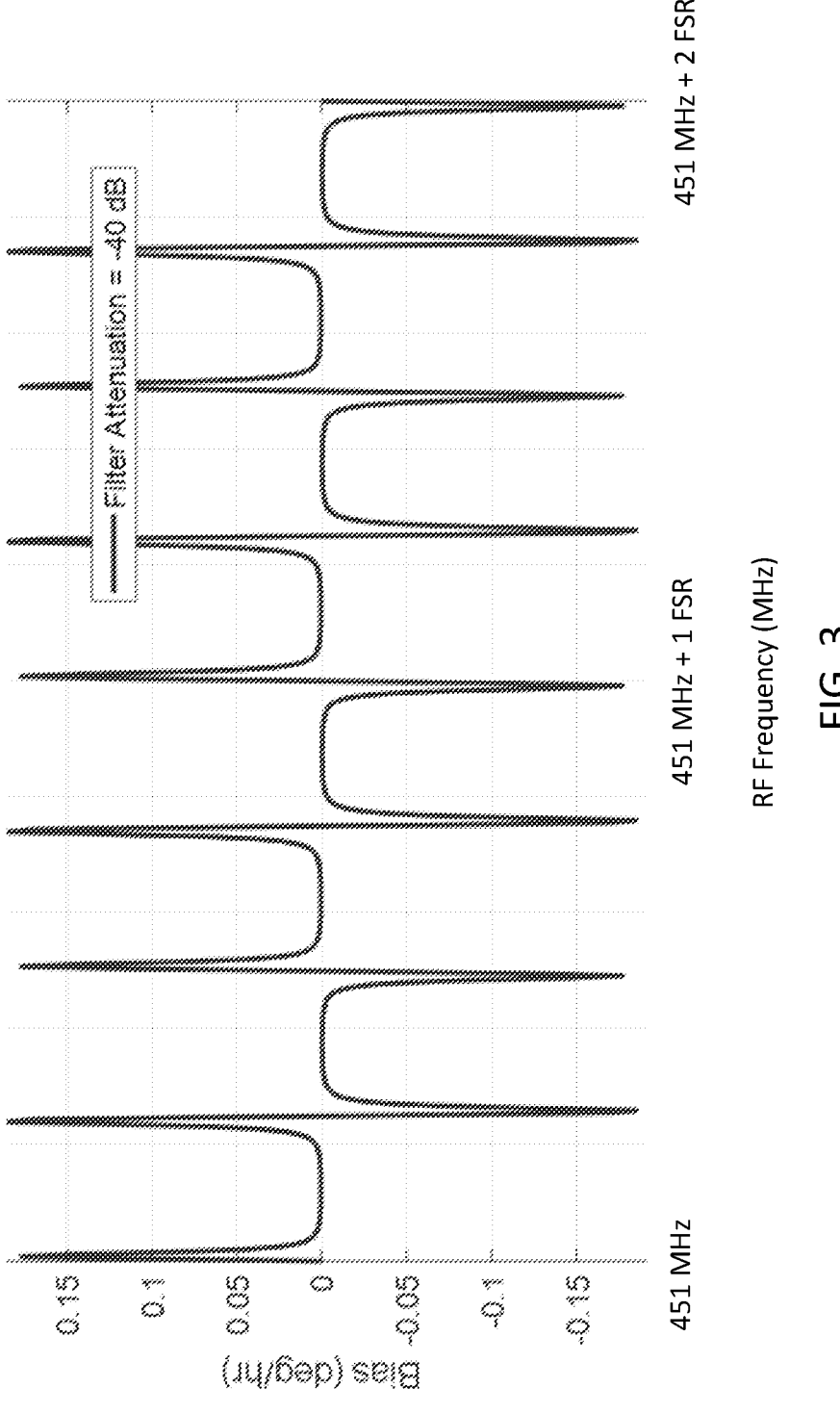
FIGS. 3 and 4 are graphs illustrating bias errors over frequency due to leakage and/or pickup of the offset frequency and harmonics thereof in the optical phase lock loops of the RFOG of FIG. 1 in the absence of appropriate filtering and shielding.

Another potential source of the recently discovered error can be seen through analysis of FIG. 2 and FIG. 3. Specifically, there can be unwanted or unintended mixer products centered around 902 MHz and 906 MHz due to the mixing of the offset frequency (451 Mz) with the beat note signal from the master laser 108 and slave 1 (110), and due to the mixing of the offset frequency (453 MHz) and the beat note signal from the master laser 108 and the slave laser 2 (112), respectively. This can cause additional sidebands on the light output by slave laser 1 (110) at multiples of 902 MHz and in the light output by slave laser 2 (112) at 906 MHz. This has been seen to cause periodic bias errors over temperature in the RFOG as it is cycled over temperature.

Figure 5:
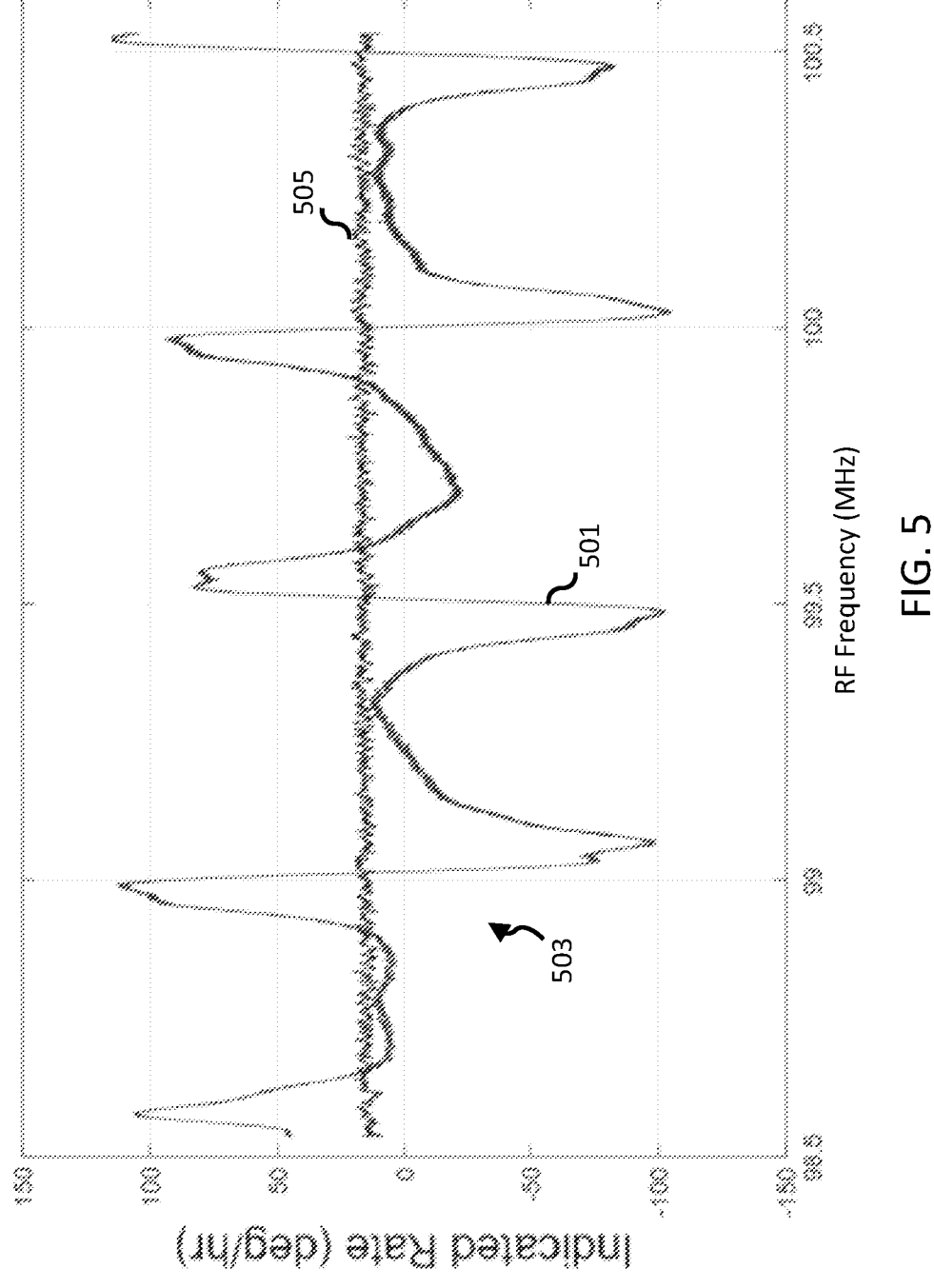
FIG. 5 is a graph of measured bias errors recorded from an RFOG.

FIG. 5 is a graph of measured bias errors recorded from an RFOG (curve 501) using the design shown and described above with respect to FIG. 1 without the remedial measures discussed below. The pick-up and mixer products result in errors, indicated for example at 503, that are evidenced by the rapid rise, fall and return to near zero of the bias error rate. The error occurs every time the laser center frequencies are tuned through ¼ FSR to track the resonator. If the free spectral range of the resonance is 2 MHz, for instance, a periodic rotation-rate error will occur every time the resonance frequency of the resonator moves by a ¼ free spectral range, as shown in FIG. 5. This error was due to the undesired sidebands at 902 MHz moving over resonator resonances in the vicinity of the sidebands. These sidebands, when the frequency is tuned in the region of the error, essentially cause non-zero 7 kHz output over a resonance nominally +902 MHz away from the main carrier frequency for slave laser 1 (110), and light from a sideband at nominally −902 MHz from the carrier frequency for slave laser 1 (110). This gives the appearance that the laser light is not on resonance at the true signal frequency, even though it is on resonance; thus, a bias error. In other words, it gives rise to a component at 7 kHz at the second demodulator output 132 (FIG. 1) that make the main signal light appear to be off-resonance in the CW direction, but it really is not. A similar, but unequal error exists in the CCW direction, and hence, a bias error occurs. This bias varies over temperature and degrades the accuracy of the RFOG over its serviceable environments.

To address the problems identified above, embodiments of the present invention employ filtering and shielding so that the signals $V_1(t)$ and $V_2(t)$ are not picked up on the laser current drives. Secondly, we deploy heavy filtering of the signals at the output of the OPLL mixers to attenuate any frequencies at twice the frequencies of $V_1(t)$ and $V_2(t)$, in this example 902 MHz and 906 MHz so they do not get introduced on the laser drive currents. In the latter case, a high performance sharply tuned notch filter 203 (FIG. 2), or any other filter that can eliminate this frequency, while allowing high bandwidth (typically 200 MHz) in the OPLL loop to pass. These provisions have been shown to greatly attenuate errors over temperature in the RFOG.

Additionally, embodiments of the present invention also include shielding on a path 211 that carries current to slave laser 1 (110). In some embodiments, the shielding is fabricated from materials that are configured to shield against magnetic and electromagnetic interference such as mu-metals and Faraday shields. Similarly, a path that carries current to slave laser 2 (112) is similarly shielded. This shielding is designed to reduce any pick-up of the $V_1(t)$ by slave laser 1 (110) or $V_2(t)$ by slave laser 2 (112). Simultaneously, these shields also attenuate of $V_1(t)$ by slave laser 2 (112) or $V_2(t)$ by slave laser 1 (110) to avoid sidebands due to crosstalk between light source channels.

Figure 6:
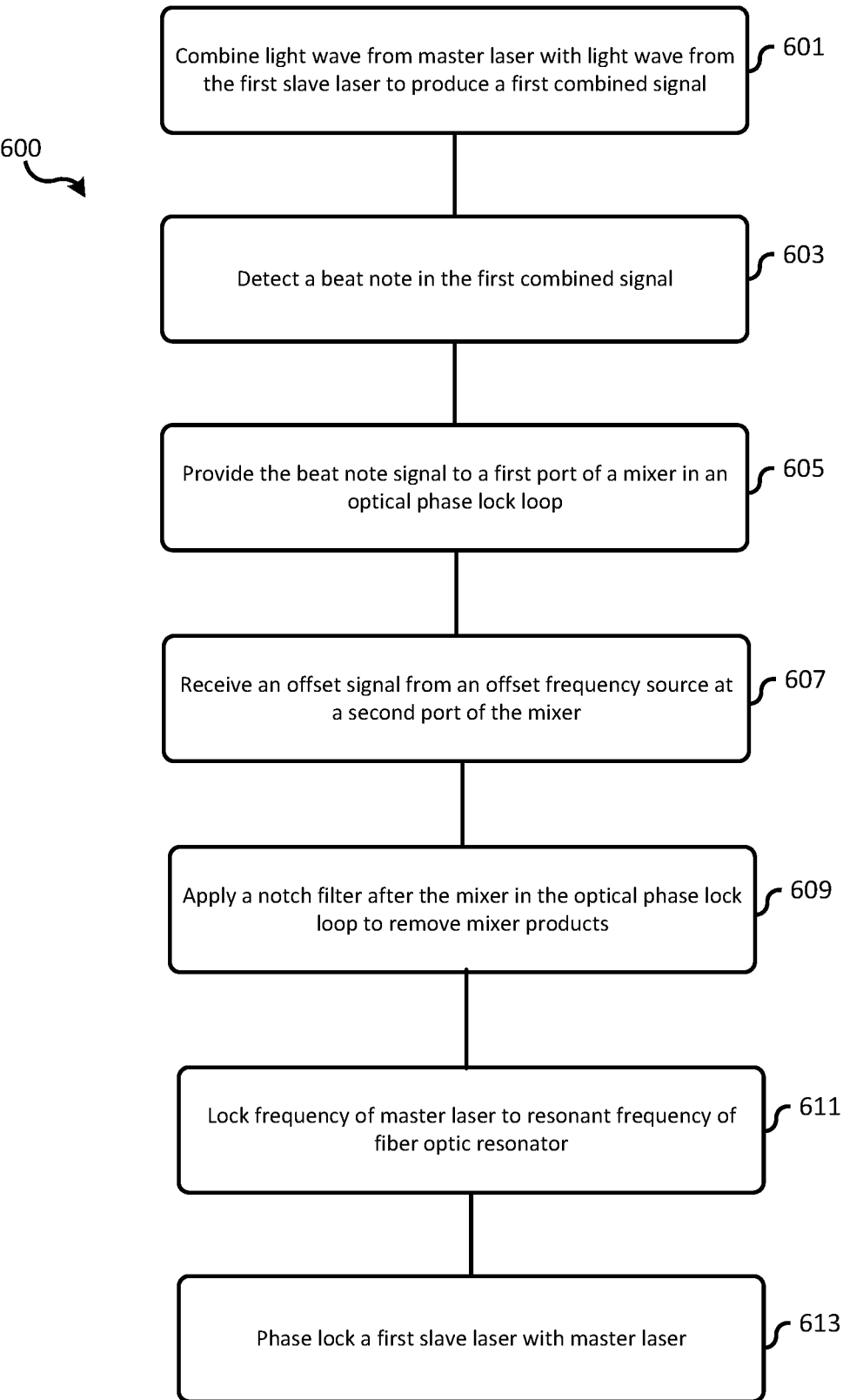
FIG. 6 is a flow chart of one embodiment of a process for reducing the impact of leakage and/or pick-up of the offset frequency and harmonics thereof in the optical phase lock loops of the RFOG of FIG. 1.

FIG. 6 is a flow chart of one embodiment of a process, indicated generally at 600, for reducing the impact of leakage and/or pick-up of the offset frequency and harmonics thereof in the optical phase lock loops of the RFOG of FIG. 1. At block 601, process 600 combines light from the master laser with light from the slave laser to produce a beat note signal. At block 603, process 600 detects the beat note signal, e.g., with a photodetector, in the first combined signal. At block 605, process 600 provides the detected beat note signal to a first port of a mixer in an optical phase lock loop. At block 607, process 600 receives an offset signal from an offset frequency source at a second port of the mixer. The form of the offset signal is given, for example, in FIG. 2. At block 609, process 600 applies a notch filter after the mixer in the optical phase lock loop to remove mixer products that resulted from signal pick-up or leakage that produced unwanted sideband signals at +/– integer multiples of the corresponding offset frequency, e.g., in one case at approximately 902 MH/or 906 MHz. At block 611, process 600 locks the frequency of light from the master laser to the resonant frequency of the fiber optic resonator. At block 613, process 600 phase locks the frequency of light from a first slave laser with the frequency of the master laser.

Figure 7:
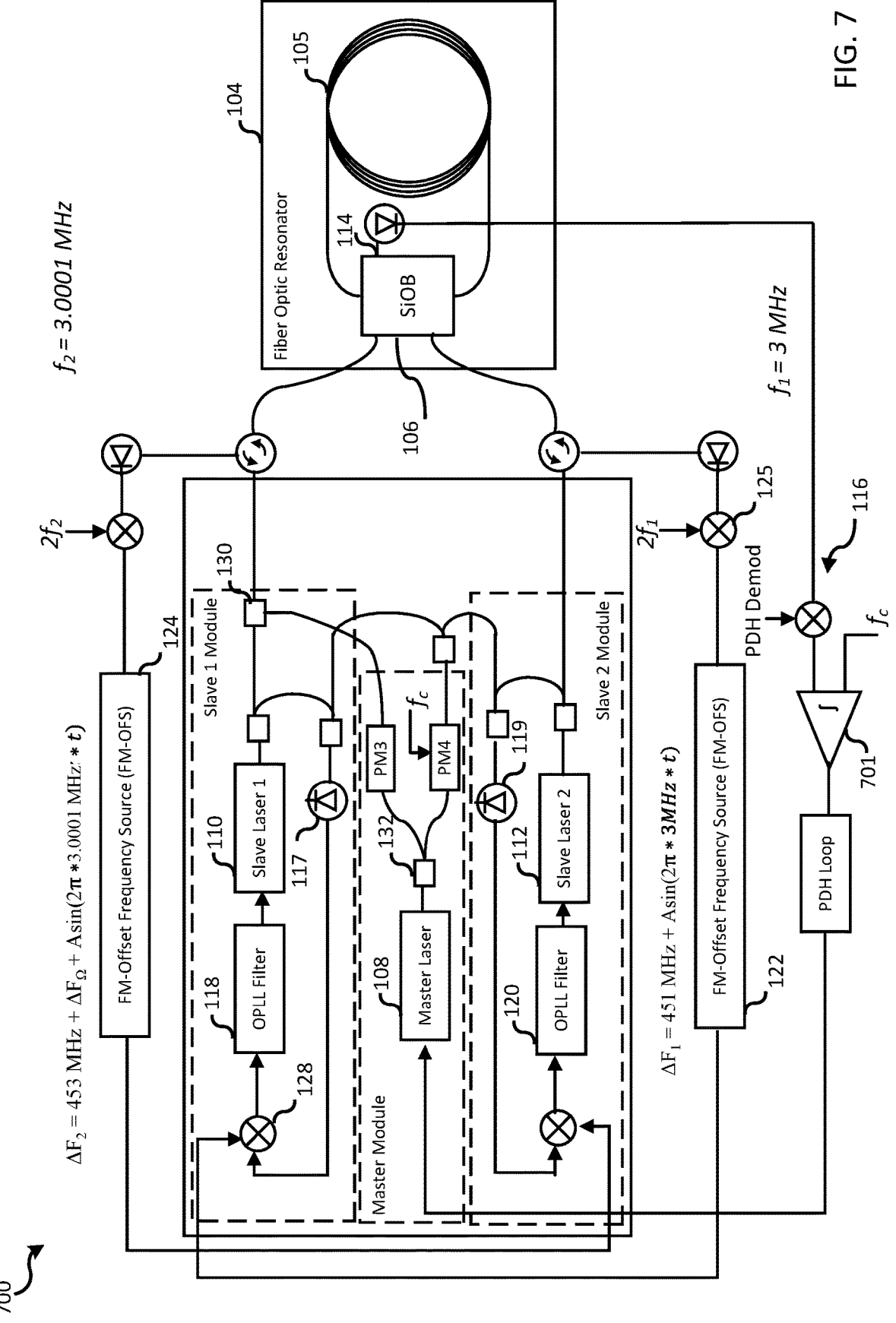
FIG. 7 is a block diagram of another embodiment of a resonator fiber optic gyroscope (RFOG) that mitigates bias errors over temperature by relocation of the common modulation compared to the RFOG of FIG. 1.

FIG. 7 is a block diagram of another embodiment of a resonator fiber optic gyroscope (RFOG), indicated generally at 700, that mitigates bias errors over temperature by relocation of the common modulation compared to the RFOG 100 of FIG. 1. For brevity and for pedagogical purposes, the common features with FIG. 1 will not be repeated here.

Rather, the description of FIG. 7 is limited to aspects not found in RFOG 100. Specifically. RFOG 700 differs from RFOG 100 in the location of the common modulation, $f_c$. In this embodiment, the common modulation has been removed from the feedback path associated with offset frequency sources 124 and 122. Rather, summing amplifier (junction) 701 (for example, an integrator with a reference input for injecting the common modulation signal) is included in the PDH loop electronics 116. By moving the common modulation out of the feedback loop, the 7 kHz component (the "B term" in $\Delta F_1$ and $\Delta F_2$) has been removed from the feedback. Hence, this low frequency (near DC) is not picked-up in the slave lasers and cannot contribute to the mixer products. Because the pick-up and mixer products have been identified as reducing the bias instability, by moving the common modulation to the PDH loop, the new source of error is effectively mitigated. Curve 505 of FIG. 5 illustrates measurements from RFOG 700 with the common modulation moved to the PDH loop. It is noted that the bias errors in curve 501 are not found in curve 503. Therefore, RFOG 700 also has improved bias stability compared to conventional RFOG designs.

EXAMPLE EMBODIMENTS

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

Example 1 includes a resonator fiber optic gyroscope (RFOG), including: a fiber optic resonator; a master laser that is configured to transmit a light wave with a frequency that is locked to a resonant frequency of the fiber optic resonator; a first slave laser that is configured to transmit a light wave at a frequency that is phase locked to the frequency of the master laser in a first optical phase lock loop at a first offset frequency to provide a clockwise signal (CW) to the fiber optic resonator; and a second slave laser that is configured to transmit a light wave at a frequency that is phase locked to the frequency of the master laser in a second optical phase lock loop at a second offset frequency to provide a counterclockwise signal (CCW) to the fiber optic resonator; wherein the first optical phase lock loop comprises a first mixer in a first feedback path for the first slave laser, the first feedback path also including a first notch filter and a first laser driver, the first notch filter coupled between the first mixer and the first laser driver and configured to receive an output of the first mixer and configured to remove mixer products from the output of the first mixer.

Example 2 includes the RFOG of example 1, wherein the second optical phase lock loop comprises a second mixer in a second feedback path for the second slave laser, the second feedback path including a second notch filter and a second laser driver, the second notch filter coupled between the second mixer and the second laser driver and configured to receive an output of the second mixer and configured to remove mixer products from the output of the second mixer.

Example 3 includes the RFOG of any of examples 1 and 2, wherein the first notch filter and the second notch filter have a notch located at a harmonic of the first offset frequency and the second offset frequency, respectively.

Example 4 includes the RFOG of example 2, and further comprising shielding on a first path and a second path that carry current to the first slave laser and the second slave laser, respectively.

Example 5 includes the RFOG of example 4, wherein the shielding is fabricated from materials that are configured to shield against magnetic and electromagnetic interference.

Example 6 includes the RFOG of any of examples 2 to 5, wherein the first optical phase lock loop also includes a first photodetector coupled to receive an optical output of the first slave laser and an optical output of the master laser, the first photodetector is AC coupled to a first input of the first mixer, and wherein the second optical phase lock loop also includes a second photodetector coupled to receive an optical output of the second slave laser and an optical output of the master laser, the second photodetector is AC coupled to a first input of the second mixer.

Example 7 includes the RFOG of example 6, wherein a second input of the first mixer is AC coupled to receive a first feedback signal from a first offset frequency source, and a second input of the second mixer is AC coupled to receive a second feedback signal from a second offset frequency source.

Example 8 includes a resonator fiber optic gyroscope (RFOG), comprising: a fiber optic resonator; a master laser that is configured to transmit a light wave with a frequency that is locked to a resonant frequency of the fiber optic resonator; a first slave laser that is configured to transmit a light wave at a frequency that is phase locked to the frequency of the master laser in a first optical phase lock loop at a first offset frequency to provide a clockwise signal (CW) to the fiber optic resonator; a second slave laser that is configured to transmit a light wave at a frequency that is phase locked to the frequency of the master laser in a second optical phase lock loop at a second offset frequency to provide a counterclockwise signal (CCW) to the fiber optic resonator; and a Pound-Drever-Hall (PDH) stabilization loop that is configured to lock the master laser to the resonant frequency, and a summing junction coupled in the PDH stabilization loop that is configured to receive a common modulation signal that has a frequency that is low relative to a linewidth of the fiber optic resonator, and causes the first slave laser and the second slave laser to have an optical frequency modulation component at the frequency of the common modulation signal.

Example 9 includes a method, comprising: combining a light wave from a master laser with a light wave from a first slave laser to produce a first combined signal including a first beat note signal; detecting the first combined signal including the first beat note signal; providing the first combined signal including the first beat note signal to a first port of a first mixer in a feedback path of a first optical phase lock loop; receiving a signal from a first offset frequency source at a second port of the first mixer; applying a first notch filter in the feedback path of the first optical phase lock loop after the first mixer to remove mixer products from an output of the first mixer; locking a frequency of the light wave from the master laser to a resonant frequency of a fiber optic resonator; and phase locking the first slave laser to the frequency of the master laser in the first optical phase lock loop at a first offset frequency.

Example 10 includes the method of example 9, and further comprising: combining the light wave from the master laser with a light wave from a second slave laser to produce a second combined signal including a second beat note signal; detecting the second combined signal including the second beat note signal; providing the second combined signal including the second beat note signal to a first port of a second mixer in a feedback path of a second optical phase lock loop; receiving a signal from a second offset frequency source at a second port of the second mixer; applying a second notch filter in the feedback path of the second optical phase lock loop after the second mixer to remove mixer products from an output of the second mixer; and phase locking the second slave laser to the frequency of the master laser in the second optical phase lock loop at a second offset frequency.

Example 11 includes the method of example 10, wherein applying a first notch filter and applying a second notch filter comprise applying a notch filter with a notch at a harmonic of the first offset frequency and applying a notch filter with a notch at a harmonic of the second offset frequency, respectively.

Example 12 includes the method of any of examples 10 and 11, and further comprising shielding a first path and a second path that carry current to the first slave laser and the second slave laser, respectively.

Example 13 includes the method of example 12, wherein shielding comprises shielding the first path and the second path against magnetic and electromagnetic interference.

Example 14 includes the method of any of examples 10 to 13, wherein providing the first combined signal to a first port of the first mixer comprises AC coupling the first combined signal to the first port, and wherein providing the second combined signal to the first port of the second mixer comprises AC coupling the second combined signal to the first port.

Example 15 includes the method of example 14, and further comprising AC coupling a first feedback signal from a first offset frequency source to a second port of the first mixer, and AC coupling a second feedback signal from a second offset frequency source to a second input of the second mixer.

Example 16 includes a method, comprising: locking a frequency of a light wave from a master laser to a resonant frequency of a fiber optic resonator using a Pound-Drever-Hall (PDH) stabilization loop; phase locking a first slave laser to the frequency of the master laser in a first optical phase lock loop at a first offset frequency; combining the light wave from the master laser with a light wave from the first slave laser to produce a first combined signal including a first beat note signal; detecting the first combined signal including the first beat note signal; providing the first combined signal including the first beat note signal to a first port of a first mixer in a feedback path of the first optical phase lock loop; receiving a signal from a first offset frequency source at a second port of the first mixer; and injecting a common modulation signal that has a frequency that is low relative to a linewidth of the fiber optic resonator into the PDH stabilization loop to modulate the first slave laser and a second slave laser at the frequency of the common modulation signal.

Example 17 includes a resonator fiber optic gyroscope (RFOG), comprising: a fiber optic resonator; a master laser that is configured to transmit a light wave with a frequency that is locked to a resonant frequency of the fiber optic resonator; a first offset frequency source that is coupled to receive a detected and demodulated light signal from the fiber optic resonator; a first slave laser that is configured to transmit a light wave at a frequency that is phase locked to the frequency of the master laser in a first optical phase lock loop at a first offset frequency from the first offset frequency source to provide a clockwise signal (CW) to the fiber optic resonator; a second offset frequency source that is coupled to receive a detected and demodulated light signal from the fiber optic resonator; a second slave laser that is configured to transmit a light wave at a frequency that is phase locked to the frequency of the master laser in a second optical phase lock loop at a second offset frequency from the second offset frequency source to provide a counterclockwise signal (CCW) to the fiber optic resonator; and wherein the first optical phase lock loop comprises a first mixer in a first feedback path for the first slave laser, the first feedback path also including a first notch filter and a first laser driver, the first notch filter configured to receive an output of the first mixer and configured to remove mixer products from the output of the first mixer; wherein the second optical phase lock loop comprises a second mixer in a second feedback path for the second slave laser, the second feedback path also including a second notch filter and a second laser driver, the second notch filter configured to receive an output of the second mixer and configured to remove mixer products from the output of the second mixer.

Example 18 includes the RFOG of example 17, and further comprising shielding on a first path and a second path that carry current to the first slave laser and the second slave laser, respectively, wherein the shielding is fabricated from materials that are configured to shield against magnetic and electromagnetic interference.

Example 19 includes the RFOG of any of examples 17 and 18, wherein the first optical phase lock loop also includes a first photodetector coupled to receive an optical output of the first slave laser, the first photodetector is AC coupled to a first input of the first mixer, and wherein the second optical phase lock loop also includes a second photodetector coupled to receive an optical output of the second slave laser, the second photodetector is AC coupled to a first input of the second mixer.

Example 20 includes the RFOG of example 19, wherein a second input of the first mixer is AC coupled to receive a first feedback signal from a first offset frequency source, and a second input of the second mixer is AC coupled to receive a second feedback signal from a second offset frequency source.

What is claimed is:

1. A resonator fiber optic gyroscope (RFOG), comprising:
a fiber optic resonator;
a master laser that is configured to transmit a light wave with a frequency that is locked to a resonant frequency of the fiber optic resonator;
a first slave laser that is configured to transmit a light wave at a frequency that is phase locked to the frequency of the master laser in a first optical phase lock loop at a first offset frequency to provide a clockwise signal (CW) to the fiber optic resonator;
a second slave laser that is configured to transmit a light wave at a frequency that is phase locked to the frequency of the master laser in a second optical phase lock loop at a second offset frequency to provide a counterclockwise signal (CCW) to the fiber optic resonator; and
a Pound-Drever-Hall (PDH) stabilization loop that is configured to lock the master laser to the resonant frequency, and a summing junction coupled in the PDH stabilization loop that is configured to receive a common modulation signal that has a frequency that is low relative to a linewidth of the fiber optic resonator, and causes the first slave laser and the second slave laser to have an optical frequency modulation component at the frequency of the common modulation signal.

2. A method, comprising:

locking a frequency of a light wave from a master laser to a resonant frequency of a fiber optic resonator using a Pound-Drever-Hall (PDH) stabilization loop;

phase locking a first slave laser to the frequency of the master laser in a first optical phase lock loop at a first offset frequency;

combining the light wave from the master laser with a light wave from the first slave laser to produce a first combined signal including a first beat note signal;

detecting the first combined signal including the first beat note signal;

providing the first combined signal including the first beat note signal to a first port of a first mixer in a feedback path of the first optical phase lock loop;

receiving a signal from a first offset frequency source at a second port of the first mixer; and injecting a common modulation signal that has a frequency that is low relative to a linewidth of the fiber optic resonator into the PDH stabilization loop to modulate the first slave laser and a second slave laser at the frequency of the common modulation signal.

* * * * *